Oct. 25, 1966     G. H. MYCROFT     3,280,785
AMPHIBIOUS STRUCTURE
Filed March 1, 1965                 3 Sheets-Sheet 1

INVENTOR.
GEORGE H. MYCROFT
BY Whittemore
Hulbert & Belknap
ATTORNEYS

Oct. 25, 1966    G. H. MYCROFT    3,280,785
AMPHIBIOUS STRUCTURE
Filed March 1, 1965    3 Sheets-Sheet 2

INVENTOR.
GEORGE H. MYCROFT
BY *Whittemore*
*Hulbert & Belknap*
ATTORNEYS

Oct. 25, 1966  G. H. MYCROFT  3,280,785
AMPHIBIOUS STRUCTURE
Filed March 1, 1965  3 Sheets-Sheet 3
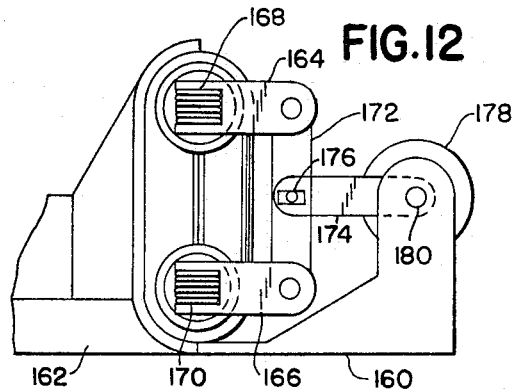
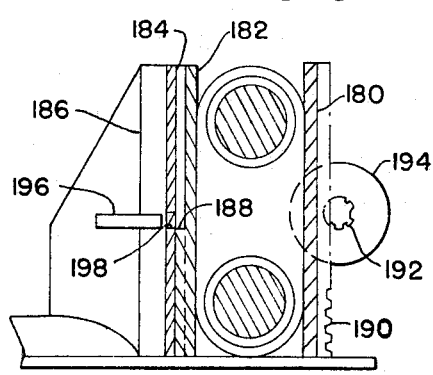
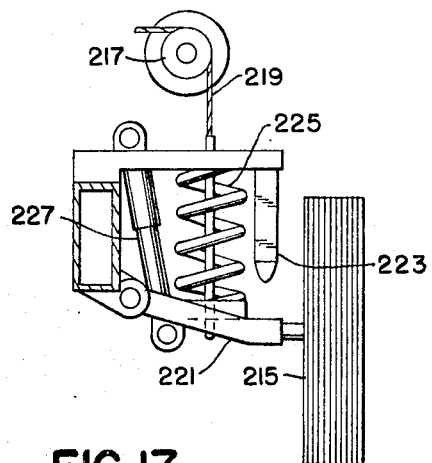
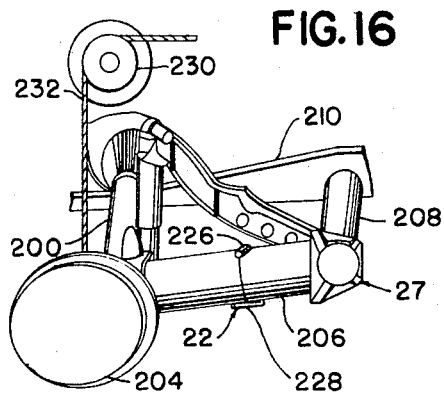
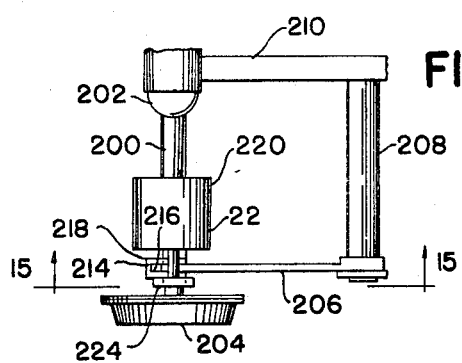
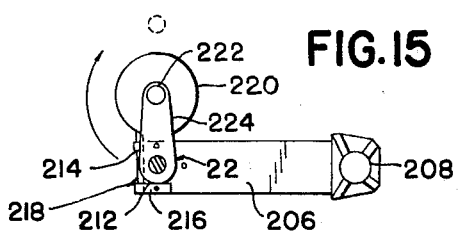
INVENTOR.
GEORGE H. MYCROFT
BY Whittemore
Hulbert & Belknap
ATTORNEYS

United States Patent Office 3,280,785
Patented Oct. 25, 1966

3,280,785
AMPHIBIOUS STRUCTURE
George H. Mycroft, 4754 S. State St., Ann Arbor, Mich.
Filed Mar. 1, 1965, Ser. No. 435,992
6 Claims. (Cl. 115—1)

The invention relates to amphibious structures and refers more specifically to a vehicle suitable for land travel as a family automobile and water travel as a pleasure boat, especially constructed for rapid transition between land and water travel and including unique roof and door structure, wheel fairing structure and wheel retracting structure.

At present many people own both an automobile and a boat. The expense of owning both a boat and an automobile is a burden to most people. Further, most people do not use both the automobile and boat at the same time. Therefore, there is a need for a single amphibious structure to replace the land bound automobile and water bound boat. The amphibious structure would reduce the over-all expense for travel on both land and water. Also, the necessity for crossing bodies of water at only predetermined points by means of rather expensive bridge structure and the requirement for separate land vehicles, such as boat trailers for moving boats to and from water would be eliminated. The expense of dock space would also be eliminated for the boater.

Amphibious structures have been provided in the past primarily for military use but occasionally as a civilian article of commerce. The amphibious structures of the past however, have been unsuccessful in that particularly poor aesthetic appearance has prevented their acceptance by the public. In addition prior amphibious structures for civilian purposes have had poor hydraulic design so that the water flow therearound has produced undesirable operation of the amphibious structure as a boat.

It is therefore one of the objects of the present invention to provide an improved amphibious structure.

Another object is to provide an amphibious vehicle having improved roof and door structure.

Another object is to provide an amphibious vehicle including doors that open upward from both sides of a roof structure that may be moved longitudinally of the vehicle to completely remove the doors and roof over the front passenger area.

Another object is to provide an amphibious vehicle including wheel fairing structure for covering the wheels of the vehicle during operation thereof as a boat to improve the water flow around the vehicle.

Another object is to provide wheel fairing structure as set forth above wherein at least some of the fairing members slide longitudinally of the vehicle to cover the wheels.

Another object is to provide wheel fairing structure as set forth above wherein at least some of the fairing members are pivoted at one end and are moved up and down at the other end out of and into wheel fairing position.

Another object is to provide wheel fairing structure as set forth above wherein at least some of the fairing members are supported on parallel links and are pivoted between a position wherein the wheels are uncovered for road operation of the vehicle and a position wherein the wheels are covered for water operation of the vehicle.

Another object is to provide an amphibious vehicle including structure for retracting the wheels of the vehicle during water operation of the vehicle.

Another object is to provide an amphibious vehicle including the front and rear wheel suspension structure of a 1965 Volkswagen automobile and the structure for retracting the front wheels includes means for moving the torsion bars of the wheel suspension structure upward through a predetermined arc and the rear wheels are retracted by means of hinging the wheel support member between the rear torsion bar and wheel and pivoting the wheel upward in a predetermined arc.

Another object is to provide an amphibious vehicle as set forth above wherein the front wheels are retracted by means of twisting the front torsion bars into a limiting position.

Another object is to provide an amphibious vehicle as set forth above wherein the front wheel suspension structure is mounted on a vertical track and rack and pinion means are provided to move the front wheel suspension up and down the track.

Another object is to provide an amphibious vehicle wherein the wheels are individually suspended and including means for separately retracting the wheels comprising structure for snubbing the wheel suspension structure against limiting bumpers therefor.

Another object is to provide amphibious vehicle structure which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 12 is an enlarged section view of modified structure for retracting the front wheels of the amphibious vehicle illustrated in FIGURE 1.

FIGURE 13 is another modification of the structure for retracting the front wheels of the amphibious vehicle illustrated in FIGURE 1.

FIGURE 14 is an enlarged plan view of a portion of the rear wheel suspension of the vehicle illustrated in FIGURE 1 showing the rear wheel retraction structure therefor.

FIGURE 15 is a partial section view of the rear wheel suspension and retraction structure illustrated in FIGURE 14 taken on the line 15—15 in FIGURE 14.

FIGURE 16 is an enlarged perspective view of modified rear wheel retracting mechanism for the amphibious vehicle illustrated in FIGURE 1.

FIGURE 17 is an elevation view of structure for retracting individually suspended vehicle wheels in amphibious vehicle structure, such as that illustrated in FIGURE 1.

Figure 1:
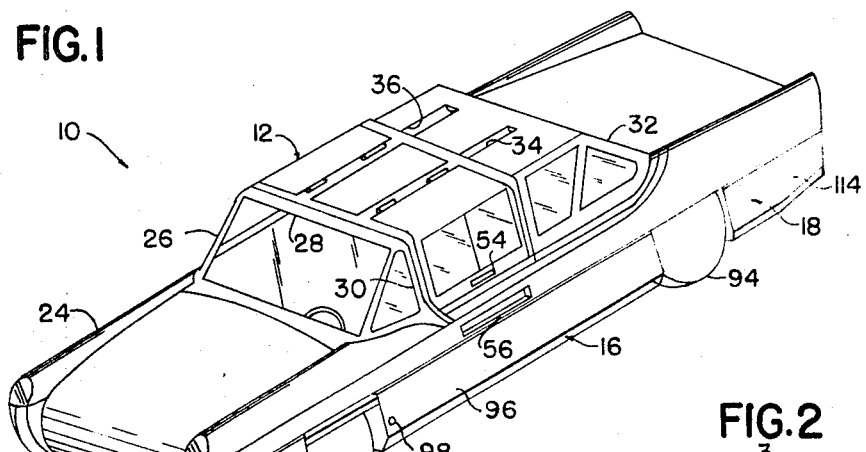
FIGURE 1 is a perspective view of amphibious vehicle structure constructed in accordance with the invention with the wheels down and the wheel fairings in position for land travel.

With particular reference to the figures of the drawing, one embodiment of the present invention will now be considered in detail.

Figure 2:
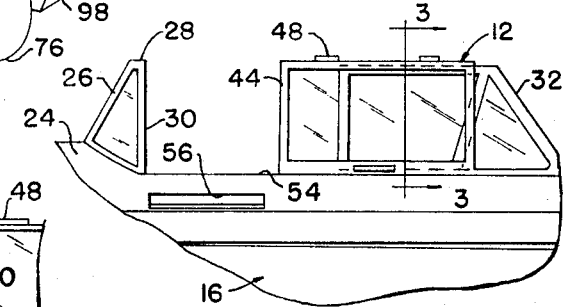
FIGURE 2 is an enlarged partial side elevation of the vehicle illustrated in FIGURE 1 showing the door and roof structure in a partially retracted position.
Figure 3:
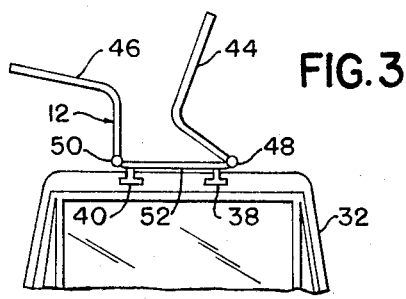
FIGURE 3 is a transverse section of the portion of the vehicle illustrated in FIGURE 2 taken substantially on the line 3—3 in FIGURE 2 with one door of the roof and door structure partly open and the other door fully open.

The amphibious vehicle 10, illustrated in FIGURE 1, includes a roof and door structure 12 in which the doors swing up, as illustrated in FIGURE 3, and which slides longitudinally of the vehicle 10, as shown in FIGURE 2, to permit easy entry into and exit from the vehicle 10. Vehicle 10 further includes the front wheel fairing structure 14 and the front and rear, rear wheel fairing structures 16 and 18 respectively. Further, front and rear wheel retracting structure 20 and 22 are provided for the amphibious vehicle 10.

Figure 4:
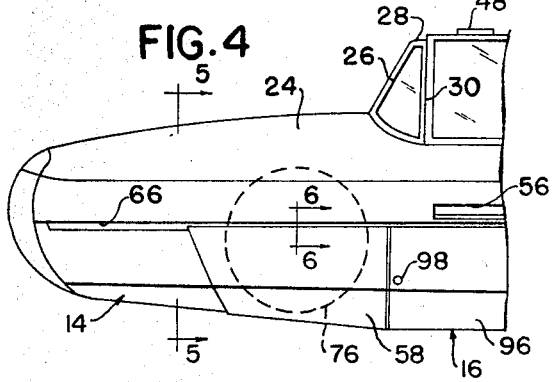
FIGURE 4 is an enlarged elevation view of the front portion of the amphibious vehicle illustrated in FIGURE 1 showing the left front wheel retracted and the left front wheel fairing in a position for water travel.
Figures 9, 10:
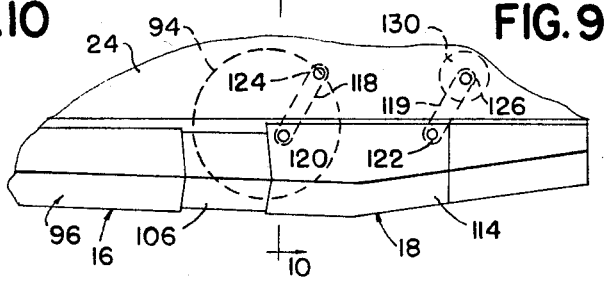
FIGURE 9 is an enlarged partial elevation view of the amphibious vehicle illustrated in FIGURE 1 showing the parallel link mounting means for the rear, rear left wheel fairing member with the wheel retracted and the fairing in position for water travel.
FIGURE 10 is an enlarged transverse cross section of the portion of the amphibious vehicle illustrated in FIGURE 9 taken substantially on the line 10—10 in FIGURE 9.

In operation of the amphibious vehicle 10 the door and roof structure 12 may be opened to permit entry of a passenger into the vehicle 10. The amphibious vehicle 10 may be driven from the land into water and is constructed to float with the bottom of the roof and door structure 12 above the water line thereof. With the vehicle 10 in the water the wheel fairing structures 14, 16 and 18 are caused to enclose the vehicle wheels, as shown in FIGURES 4 and 9, to provide smooth flow of water around the amphibious vehicle 10. Before the wheel fairing structures 14, 16 and 18 are moved to cover the vehicle wheels the vehicle wheels are retracted as by means of the wheel retracting structure 20 and 22 illustrated in FIGURES 11 and 14. When water travel has been completed the wheel fairing structures 14, 16 and 18 are returned to the position thereof illustrated in FIGURE 1, the wheels are put down and the amphibious vehicle 10 may be driven on land.

Thus, the amphibious vehicle 10, as illustrated in FIGURE 1, provides convenient inexpensive and comfortable travel on both land and water with the transition therebetween being extremely simple.

More specifically the amphibious vehicle 10, as shown in FIGURE 1, is constructed on the chassis 23 and with the front and rear wheel suspensions 25 and 27 of the Volkswagen automobile of, for example the 1965 model. The Volkswagen body will not be used and a body constructed of suitable material such as light metal or fiberglass 24 will be substituted therefor. The body 24, as shown in FIGURE 1, includes a windshield structure 26 having the top supporting bar 28 and the side supporting bars 30. The body 24 further includes a fixed roof portion 32.

The fixed roof portion 32 of the body 24 is provided with a pair of parallel recesses 34 and 36 therein extending longitudinally of vehicle 10 and having an inverted T-shaped cross section, as illustrated best in FIGURE 3. The roof and door structure 12 of the amphibious vehicle 10 is of a dimension to slide over the fixed roof portion 32, as shown in FIGURE 2. The roof and door structure 12 includes downwardly extending inverted T-shaped guides 38 and 40 extending into the recesses 34 and 36. The inverted T-shaped guides 38 and 40 permit guided movement of the roof and door structure 12 of the amphibious vehicle 10 longitudinally of the vehicle.

As shown best in FIGURE 3, the doors 44 and 46 are hinged at 48 and 50, respectively, and may be raised upwardly after being unlatched. Required sealing and latching mechanism, well known in the automotive art, are provided around the periphery of the roof and door structure 12. Locking means are also provided for securing the roof and door structure 12 in a closed position and for separately securing each of the doors 44 and 46 in a closed locked position.

The doors 44 and 46, as shown in FIGURE 3, are capable of folding back over the central portion 52 of the roof and door structure 12 to permit standing in the vehicle 10. Thus on entering the vehicle 10, one of the doors, for example door 44, is raised and folded back over the central portion 52 of the roof and door structure 12, as shown in FIGURE 3. The passenger may then step over the window sill 54 into the vehicle 10, after which the passenger may be seated. If desired a step 56 may be recessed into the side of the body 24, as illustrated in FIGURE 1, to provide two-step entry into the vehicle 10 on land. With the vehicle 10 in water a passenger will normally be required to step down from a dock or the like into the vehicle 10 with the door and top structure 12 moved longitudinally into a rearward position or with one of the doors 44 or 46 open.

Figure 5:
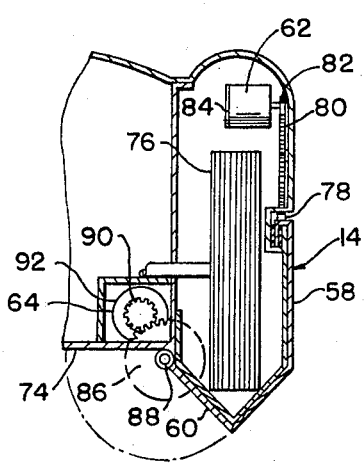
FIGURE 5 is an enlarged partial section view of the amphibious vehicle illustrated in FIGURE 4 taken substantially on the line 5—5 in FIGURE 4.
Figure 6:
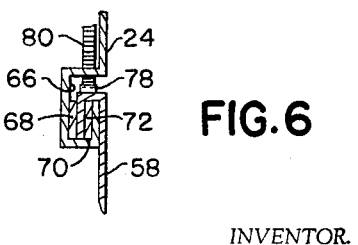
FIGURE 6 is an enlarged partial section view of the amphibious vehicle illustrated in FIGURE 4 taken substantially on the line 6—6 in FIGURE 4.

The front wheel fairing structure 14, as best shown in FIGURES 4–6, includes an outer fairing member 58 and an inner fairing member 60. Mechanism 62 is provided for moving the outer fairing member 58 longitudinally of the amphibious vehicle 10 while structure 64 is provided to pivot the inner fairing member 60.

A recess 66 is provided in the body member 24 at the top of the outer fairing member 58 in which the plastic bearing plates 68 and 70 are positioned. The outer fairing member includes the open returned flange 72 positioned between the bearing plates 68 and 70.

Thus, in operation on land the outer fairing member 58 is in a forward position, as shown in FIGURE 1, and the inner fairing member 60 is in an up or a horizontal position wherein it rests against the underside of the vehicle bottom 74. During operation of the vehicle 10 in the water the front wheel outer fairing member 58 is caused to move rearwardly by the structure 62 and the inner fairing member 60 is caused to pivot in a counterclockwise direction into the positions illustrated in FIGURES 4 and 5. The retracted vehicle front wheel 76 is thus enclosed by fairing members 58 and 60 to provide smooth water flow therearound.

The structure 62 for automatically moving the outer fairing member 58 longitudinally of the vehicle 10 includes a rack 78 on the top of the outer fairing member 58, a gear 80 in mesh with the rack 78, a pinion 82 in mesh with the gear 80 and a motor 84 connected for driving the pinion 82 on energization thereof. The structure 64 for pivoting the inner fairing member 60 counterclockwise into the position shown in FIGURE 5 comprises the gear 86 secured to the inner fairing member 60 for rotation therewith about the pivot mounting 88 and pinion 90 in mesh with the gear 86 and driven on actuation of motor 92. The motors 84 and 92 may be energized from the interior of the amphibious vehicle 10 by an electric switch or the like. Convenient mounting means for the gears 80 and 86, pinions 82 and 90 and motors 84 and 92 are provided as needed. A single multiple drive motor may be used in place of the two motors 84 and 92 illustrated in FIGURE 5, if desired.

The outer front fairing member 96 for the left rear wheel 94 is pivoted to the body 24 by pivot means 98 and may be driven in either a clockwise direction or a counterclockwise direction by the motor 100 connected to the pivot means 98. The outer fairing member 96 includes open returned longitudinal sides 102 and 104 slidingly holding the rear wheel fairing member 106 therein. The rear wheel fairing member 106 is provided with a rack 108 thereon extending longitudinally thereof adapted to engage the pinion 110 with the fairing member 96 in a lowermost position. The pinion 110 may be rotated by motor 112 to slide the fairing member 106 longitudinally of the outer fairing member 96.

Figure 7:
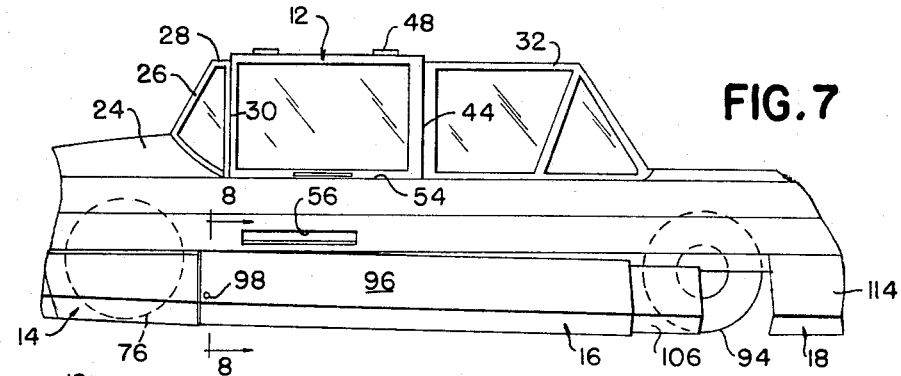
FIGURE 7 is an enlarged partial elevational view of the amphibious vehicle illustrated in FIGURE 1 showing the front fairing for the left rear wheel with the left rear wheel retracted and the fairing in position for water travel.
Figure 18:
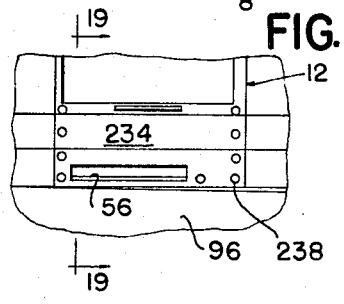
FIGURE 18 is a partial elevation view of a modification of the amphibious vehicle illustrated in FIGURE 1.
Figure 8:
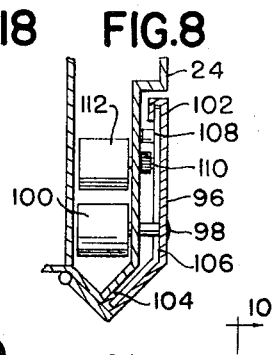
FIGURE 8 is an enlarged partial transverse cross section of the portion of the amphibious vehicle illustrated in FIGURE 7 taken substantially on the line 8—8 in FIGURE 7.

Thus when water operation of the amphibious vehicle 10 is desired the motor 100 is energized to rotate the outer fairing member 96 clockwise into the position shown in FIGURE 7. The rack 108 engages the pinion 110 at this time and motor 112 is energized. The fairing member 106 is then moved rearwardly of the vehicle 10 into the position illustrated in FIGURE 7 wherein it encloses the forward portion of the rear vehicle wheel 94.

The enclosure of the outside of the rear wheel 94 in a retracted position may be completed with the outer rear fairing member 114 of fairing structure 18.

The fairing member 114 is supported on two parallel links 118 and 119 for movement between two uppermost positions. The lower ends 120 and 122 of the parallel links 118 and 119 are pivotally connected to the rear wheel fairing member 114. The upper end 124 of the front parallel link is pivotally mounted in a fixed position on body 24 while the upper end 126 of the rear parallel link 119 is connected to the motor 130. Thus, in operation the motor 130 is actuated to rotate the parallel links counterclockwise to move the fairing member 114 into the position shown in FIGURE 1 and to rotate the links into the extreme clockwise position shown in FIGURE 9 to cover the rear part of the vehicle wheel with the fairing member 114.

An inner fairing member similar to and actuated in the same manner as the inner fairing member 60 in conjunction with the front wheel 76 is provided in conjunction with the fairing members 96 and 106 and fairing member 114 to complete the enclosure of the rear wheels 94.

Figure 11:
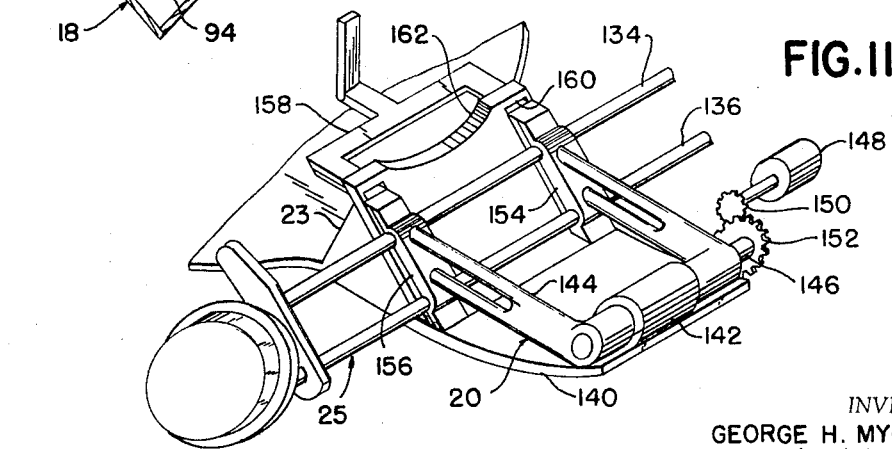
FIGURE 11 is an enlarged perspective view of front wheel retracting mechanism for the amphibious vehicle illustrated in FIGURE 1.

Retraction of the front wheels 76 of the amphibious vehicle 10 for water operation and lowering of the wheels 76 for land operation is according to the invention accomplished by structure 20 illustrated best in FIGURE 11. FIGURE 11 illustrates the torsion bars 134 and 136 of the front wheel suspension system 25 and chassis 23 of a standard 1965 Volkswagen. The torsion bars 134 and 136 are in the usual Volkswagen construction bolted to the chassis 23 and are rigidly maintained in such position.

In accordance with the present invention the chassis 23 has been extended to provide the pivot mount 140 having the pivot hinge portion 142 secured thereto. The wheel retraction lever arms 144 are pivotally mounted in the hinge portion 142 for rotation with the shaft 146 on the motor 142 being energized due to meshing of the pinion 150 driven by the motor 148 and the gear 152 in driving relation to the shaft 146. The lever arms 144 rigidly hold the torsion bars 134 and 136 in brackets 154 and 156. A locking bar 158 extends through the openings 160 in the mounting plate 162 to lock the front wheel suspension torsion bars 134 and 136 in a fixed down position. Mounting plate 162 is secured to chassis 23 in a fixed position.

Thus, in operation when it is desired to retract the front wheels 76, the locking bar 158 is withdrawn from the openings 160 in the mounting plate 162 by convenient mechanical or automatic electric means. The motor 148 is then actuated to rotate the lever arms 144 clockwise. The wheels 76 are thus moved into an uppermost position therefor. Suitable linkage may be provided to permit arcuate movement of the usual Volkswagen road steering mechanism if desired. Alternatively, the road steering mechanism could be redesigned to disconnect on movement of the torsion bars 134 and 136 into a retracted position and to reconnect on pivoting the lever arms 144 in a counterclockwise direction to lower the wheels 76 into a locked, land travel position.

As indicated diagrammatically in FIGURE 12, the front wheels of the amphibious vehicle 10 may be retracted by structure other than structure 20. Thus, for example, the mounting bracket 160 may be added to the front of the usual Volkswagen chassis 162. The parallel levers 164 and 166 are rigidly attached at one end to the torsion bars 168 and 170 of the usual Volkswagen front wheel suspension and are connected together by the link 172 pivotally connected thereto at the opposite ends thereof. The third lever 174 is connected for rotation with the shaft 180 on energization of motor 178. The lever 174 is further connected to the link 172 at the outer end thereof by the lost motion connection 176. Thus, on actuation of the motor 178 torsion may be applied to the torsion bars 168 and 170 to place the front wheels of the vehicle 10 in a limiting upward position. The wheels will thus be retracted by limit operation of the usual front wheel suspension system.

Still another modification of the structure for retracting the front wheels of the amphibious vehicle 10 is illustrated in FIGURE 13. Thus in FIGURE 13 a front and rear mounting plate 180 and 182 are provided to which the torsion bars of the front suspension of the amphibious vehicle structure 10 are secured. A track 184 is provided on the front of the vehicle chassis and a slide 188 is provided on the rear mounting plate 182 movable vertically in the track 184. A rack 190 is provided on the front mounting plate 180 and is engaged by the pinion 192 rotated on actuation of motor 194 to move the front wheel suspension of the vehicle in up and down directions. Suitable means, such as a sliding lock 196 adapted to extend through an opening 198 in the track may be provided to lock the vehicle suspension system in a down position.

The rear wheels 94 of the vehicle 10 like the rear wheels of the Volkswagen are independently suspended as illustrated in FIGURES 14 and 15. Thus, the axle 200 is supported at one end by the universal joint 202 for movement defining a portion of a cone having the apex at the universal joint 202. The wheel drum 204 to which a wheel 94 is secured is maintained in a resiliently supported road travel position by the flat spring support member 206 rigidly secured at one end to the torsion bar 208 which in turn is attached to the vehicle frame 210. The axle 200 is secured in a fixed position in the recess 212 in the end of the spring support member 206 by the removable locking member 214 slidable vertically in slots 216 in the members 218 rigidly secured to the spring 206.

Thus, in operation with the locking member 214 in the position illustrated in FIGURES 14 and 15, resilient mounting of the wheel drum 204 is accomplished in the usual manner. Road shock is absorbed as a combined function of the torsion longitudinally of the vehicle on the torsion bar 208 and transversely of the vehicle on the leaf spring 206.

With the vehicle 10 in the water the locking member 214 is withdrawn from the members 218 and the motor 220 which may be supported from the vehicle frame by suitable resilient or lost motion connections (not shown) is rotated clockwise, as illustrated in FIGURE 15, whereby the axle 200 secured to the motor drive shaft 222 by the connecting link 224 is caused to describe half of the surface of a cone having its apex at the universal joint 202 and to thus provide raising of the rear wheels 94. Synchronizing the movement of the locking member 214 and actuation of the motor 220 may be accomplished either manually or automatically in a known manner.

Alternatively, as shown in FIGURE 16, the support member 206 can be split vertically and a hinge 226 provided on the top thereof cooperating with a toggle clamp 228 secured to the bottom of the support member extending over the split therein. Thus, in conjunction with a cable 232 and motor means 230 for winding the cable up or passing out the cable attached to the wheel drum 200, the drum 200 may be retracted for water travel with the toggle clamp loose. Road travel may be accomplished with the toggle clamp closed and the cable extended.

In a similar manner with other vehicles which, for example, may have individual suspension, as shown in FIGURE 17, the wheels 215 may be retracted by means of a suitable mechanical crank 217 operating on the cable 219 to snub the A-frame 221 against the bumpers 223 at the end of the travel allowed by the suspension spring 225 and shock absorber 227.

Figure 19:
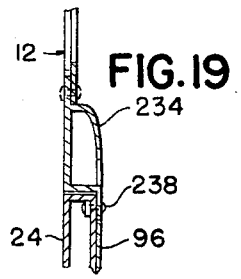
FIGURE 19 is an enlarged cross section view of the modified vehicle structure illustrated in FIGURE 18 taken substantially on the line 19—19 in FIGURE 18.

To provide easier entry into the vehicle 10 in the winter when water travel is not normally required, portions 234 of the body 24 may be separate from the rest of the body so that they may be secured to the door and roof structure 12 in the winter by means, such as the bolts 240, shown in phantom in FIGURE 19. The body portions 234 will thus open and close with the doors in the winter. The portions 234 of the body 24 will in the usual case, although not necessarily, prevent sliding of the roof and door structure 12 over the fixed portion 32 of the roof of the vehicle 10. This will not however be objectionable under winter driving conditions. In the summer when water travel is desired, the portions 234 of the body 24 are secured to the body 24 by bolts 238 in a watertight connection.

Several drive systems suitable for combined land and water use in amphibious vehicles are well known and form no part of the present invention. They will not therefore be considered in detail herein. It is obvious that some such drive system for operation of the disclosed vehicle alternatively on either land or water is necessary. Similarly the steering mechanism for both land and water vehicles are well known and are not part of the present invention. They will likewise not be considered in detail herein.

While one embodiment of the present invention and modifications thereof have been considered in detail, it will be understood that other embodiments and modifications are contemplated. For example, a single hydraulic motor may be used to actuate all the fairing and retraction structures to ready the vehicle for either land or water travel in place of the individual electric motor specifically disclosed. It is the intention to include all embodiments and modifications as are defined by the appended claims within the scope of the invention.

What I claim as my invention is:

1. Wheel fairing structure for fairing a wheel in a retracted position comprising a track positioned over the wheel, an outer fairing member slidably positioned on said track and movable longitudinally thereof into and out of a wheel fairing position, means for sliding the outer wheel fairing into and out of a wheel fairing position, an inner wheel fairing member pivotally mounted for pivotal movement about an axis parallel to the track into and out of a wheel fairing position and means for pivoting the inner wheel fairing member into and out of a wheel fairing position.

2. Structure as set forth in claim 1 wherein the means for sliding the outer wheel fairing into and out of a wheel fairing position comprises a rack secured to the wheel fairing, motor means, a pinion secured to the motor means and driven thereby, and a gear positioned between the pinion and rack.

3. Structure as set forth in claim 1 wherein the means for pivoting the inner wheel fairing member into and out of a wheel fairing position comprises motor means, a pinion secured to and driven by the motor means, and a gear secured to the inner wheel fairing for rotation about said axis and in mesh with said pinion.

4. In an amphibious vehicle having a chassis, a body and wheel suspension structure secured to the chassis and wheels including at least one front wheel secured to the wheel suspension structure, means for retracting the wheels of the vehicle and wheel fairing structure for fairing each of the wheels in a retracted position to provide optimum water flow around the wheels of the vehicle during water travel with the front wheel fairing structure comprising a track on the body forward of the front wheel, an outer fairing member slidably positioned on said track and movable longitudinally thereof into and out of a wheel fairing position, means for sliding the outer wheel fairing into a wheel fairing position, an inner wheel fairing member, means pivotally mounting the inner wheel fairing member on the vehicle for pivotal movement about an axis extending longitudinally of the vehicle into and out of a wheel fairing position, and means for pivoting the inner wheel fairing member into and out of a wheel fairing position.

5. Structure as set forth in claim 4 wherein the means for sliding the outer wheel fairing into and out of a wheel fairing position comprises a rack secured to the wheel fairing, motor means, a pinion secured to the motor means and driven thereby, and a gear positioned between the pinion and rack.

6. Structure as set forth in claim 4 wherein the means for pivoting the inner wheel fairing member into and out of a wheel fairing position comprises motor means, a pinion secured to and driven by the motor means, and a gear secured to the inner wheel fairing for rotation about said axis and in mesh with said pinion.

References Cited by the Examiner

UNITED STATES PATENTS

| 1,602,812 | 10/1926 | Cook | 115—1 |
|---|---|---|---|
| 1,919,387 | 7/1933 | Stringer | 296—47 |
| 2,048,181 | 7/1936 | Cook | 115—1 |
| 2,646,949 | 7/1953 | Saulnier | 244—121 |
| 2,731,220 | 1/1956 | Power | 244—121 |
| 2,984,516 | 5/1961 | Wilfert | 296—47 |
| 3,151,663 | 10/1964 | Bohner et al. | 115—1 |
| 3,166,039 | 1/1965 | Weymouth | 115—1 |

MILTON BUCHLER, *Primary Examiner.*

ANDREW H. FARRELL, *Examiner.*